Nov. 9, 1954  O. W. DETTINGER  2,693,697
ROCKWELL TESTING DEVICE
Filed May 27, 1950  3 Sheets-Sheet 1

INVENTOR
Otto W. Dettinger
by
Richard Geier
ATTORNEYS

Nov. 9, 1954   O. W. DETTINGER   2,693,697
ROCKWELL TESTING DEVICE

Filed May 27, 1950   3 Sheets-Sheet 2

INVENTOR
Otto W. Dettinger
BY
Richards y Geier
ATTORNEYS

Nov. 9, 1954

O. W. DETTINGER 2,693,697

ROCKWELL TESTING DEVICE

Filed May 27, 1950

3 Sheets-Sheet 3

INVENTOR:
Otto W. Dettinger
BY
Richards geier
ATTORNEYS

United States Patent Office 2,693,697
Patented Nov. 9, 1954

2,693,697

ROCKWELL TESTING DEVICE

Otto W. Dettinger, Esslingen, Germany, assignor to Georg Reicherter, Esslingen, Germany, a company Application May 27, 1950, Serial No. 164,716

Claims priority, application Germany May 30, 1949

7 Claims. (Cl. 73—83)

Testing by means of a Rockwell testing device is preferably employed when large quantities of hardened or heat-treated parts are to be tested. This type of testing is of special advantage in mass or quantity production because it eliminates the human factor in the testing operation and insures accurate results.

There are at present a number of automatic testers in use. In most of these the test screw is stationary or moves only up to the moment when the minor load is applied, whereupon the major load is applied through a linkage system. There are other machines known at present which control all movements of the testing cycle except maintaining the dial indicator deflection through the reciprocating motion of the test screw. This arrangement has however the disadvantage that the value indicated on the dial is not maintained up to the time when the next testing cycle begins. The time for reading the value is therefore very short and the possibility of faulty readings very great.

The present invention avoids the stated disadvantage without losing any of the other known advantages of testing devices by providing a special arrangement which allows the pointer of the dial to remain at its deflected position and to indicate the hardness of the piece tested until the next test begins.

The invention accordingly comprises the elements and combination of elements, features of construction, and arrangements of parts which will be exemplified in the structure hereinafter described, and the scope of the application which will be indicated in the following claims.

Figure 2:
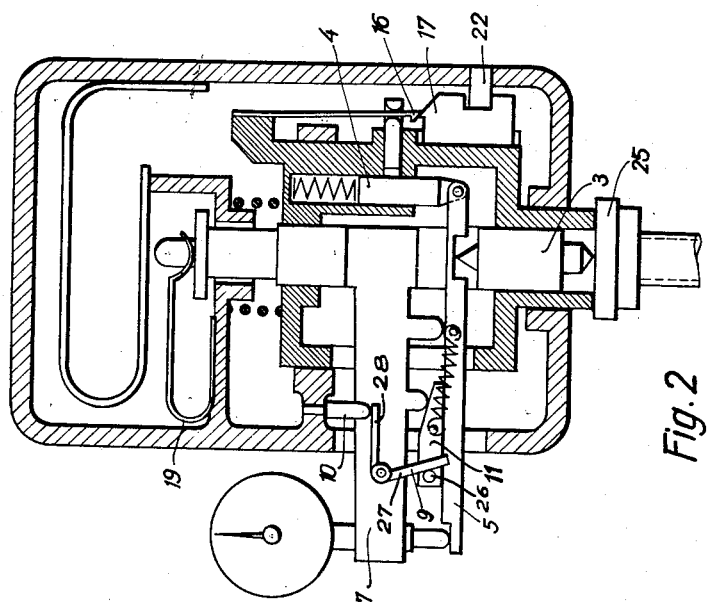
Figure 1:
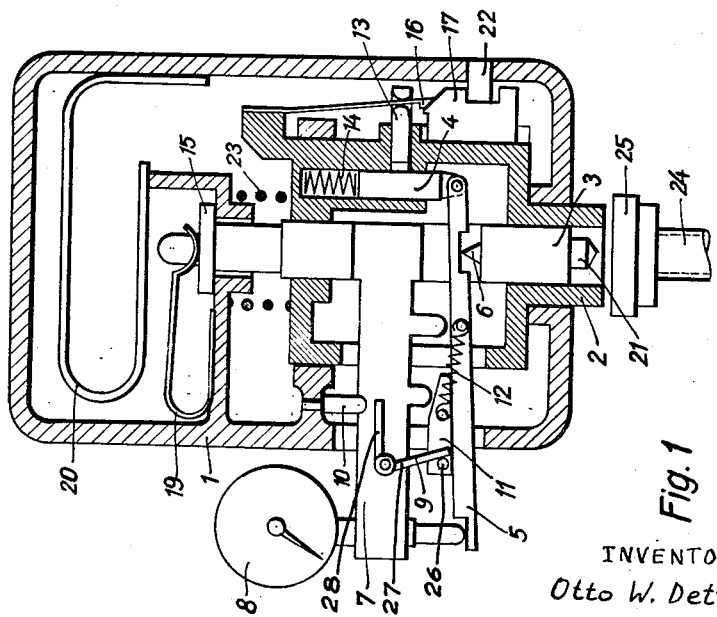
Figure 4:
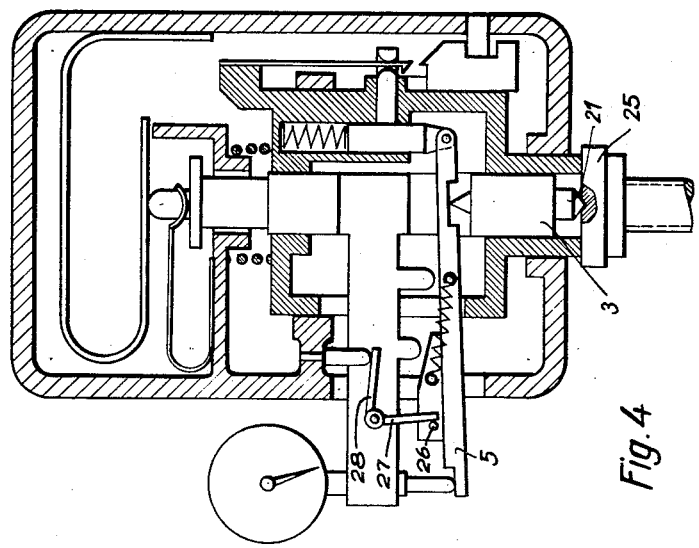
Figure 3:
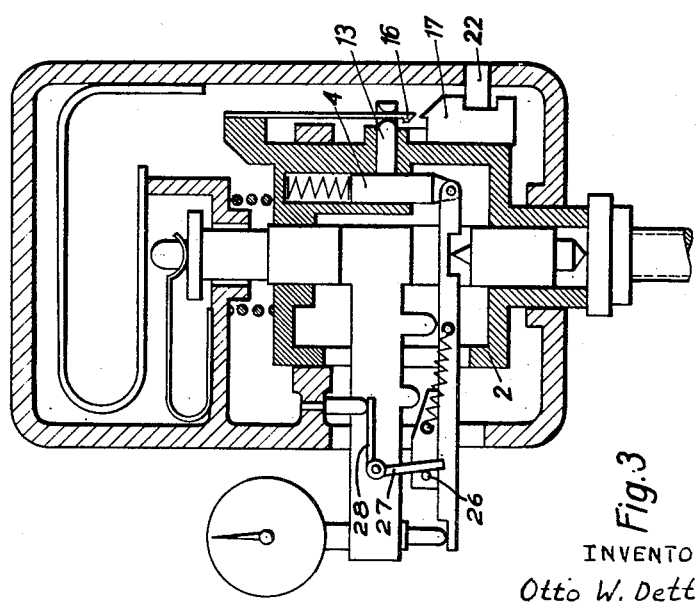
Figure 6:
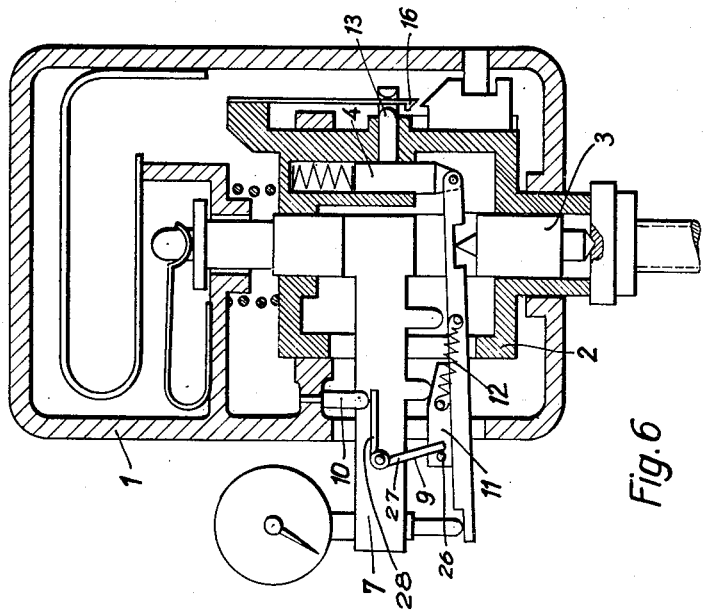
Figure 5:
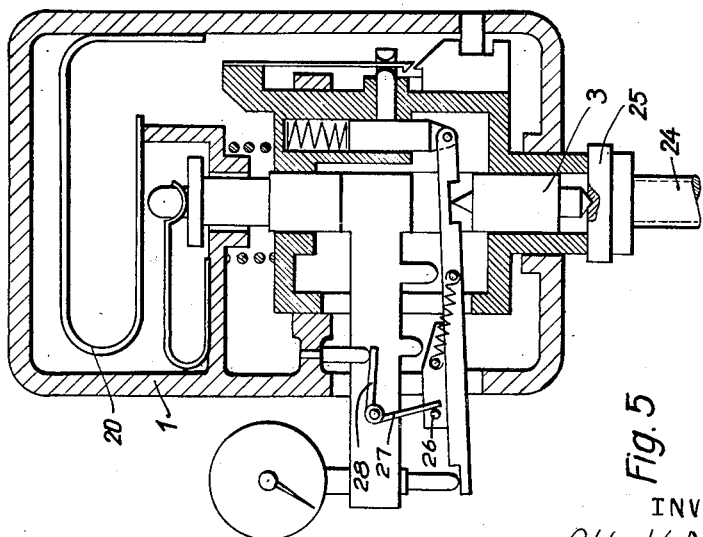

In the accompanying drawings, in which one of the various possible embodiments of the invention is illustrated, Fig. 1 is a cross-sectional view of the tester in its initial position, Fig. 2 is a cross-sectional view of the tester with the minor load applied, Fig. 3 is a cross-sectional view of the tester in a position immediately before major load is applied, Fig. 4 is a cross-sectional view of the tester with the major load applied, Fig. 5 is a cross-sectional view of the tester with the testing screw somewhat retracted, Fig. 6 is a cross-sectional view of the tester with the testing rod almost back in its initial position.

Similar reference characters indicate corresponding parts throughout the various figures.

Referring to Figs. 1 to 6 the testing mechanism comprises a frame 1 in which the testing mechanism is housed. Fixed to this frame is a minor load spring 19 and a major load spring 20. The work to be tested which is denoted by 25 rests on the test screw 24. Slidably arranged in this frame is a supporting case 2 in which a test rod 3 and a sliding member 4 can move in a vertical direction. A spring 23 is arranged between the frame and the supporting case 2. Pinned to the latter or otherwise connected is the dial indicator arm 5 which is in constant contact with a knife edge 6 fastened to the test rod 3. The test rod is rigidly connected with the dial indicator holder 7 which carries the dial indicator 8. Pivotally mounted on dial indicator holder 7 is a bell crank 9 having an arm 28 which is, during a certain portion of the cycle, in contact with a stop 10 fixed to the frame. The other arm 27 of this bell crank is in permanent connection with a stop 26 of a sliding wedge 11 slidably arranged on the dial indicator arm 5. A spring 12 acts on said wedge, the spring being fastened to the wedge and to the dial indicator arm. This spring could however be mounted between the wedge and some other part of the testing mechanism, e. g. the test rod.

The supporting case has an opening for a locking member 13 which couples the slide member 4 with the test box 2 immediately before the major load is applied by frictional contact. During the time this frictional contact is maintained and during the time the wedge is in its extreme position, the dial indicator arm will transmit the penetration of the penetrator 21 at an enlarged scale to the dial indicator. This frictional contact will not be released until, after removal of the major load, the wedge 11 has shifted to a position between the dial indicator holder and the dial gauge arm to provide a rigid connection between these two parts so that there can be no relative movement therebetween. When this contact is released, the spring 14, also released through this action, can push sliding member 4 down on the dial indicator arm and thus maintain the indicator deflection even when the test rod rests on the frame with its shoulder 15. Thus the hardness value remains fixed until the following test. The automatic application and release of pressure on the locking member 13 is effected by means of a leaf spring 16 which is fixed to the supporting case with its one end and presses with its free end, depending on the relative position of the supporting case to the frame, either on the locking member 13 or on the slanted edge of the preferably wedge-shaped block 17, which is moved through a stop 22 fastened to the frame when the supporting case moves.

The operation of the mechanism including the action of the minor load and major load springs 19 and 20 during the test is illustrated in the Figures 1 to 6 which show the testing mechanism in various positions of the testing cycle.

Fig. 1 shows the testing mechanism in its initial position. The supporting case 2 is pressed down on its seat in the frame 1 through a spring 23. The minor load spring 19 presses on the shoulder 15 and forces the test rod on its seat. The locking member 13 cannot yet push on the sliding member 4 because the spring 16 is not yet released. Thus the spring 14 forces the sliding member down, with the result that the dial indicator arm 5 pushes through the wedge 11 against the dial gauge holder 7. The dial gauge still indicates the value of the last test.

In Fig. 2 the work 25 placed on the testing screw 24 has lifted the test box 2 and the test rod 3. Now the minor load is applied to the work through the minor load spring 25. One arm of the bell crank 9 has come into contact with the stop 10 which causes the wedge to move towards the left. This allows the sliding block 4 which is yet free to move, to force the dial indicator arm 5 against the dial gauge holder 7, which action causes the dial indicator pointer to be returned to zero. The stop 22 has just started to remove the wedge-shaped block 17 from below the leaf spring 16.

Fig. 3 shows the testing mechanism immediately before major load is applied. The stop 22 has withdrawn the block 17 from under the leaf spring to such an extent that the latter forces the locking member 13 against the sliding member 4 which is now fixed in position relative to the supporting case. The pointer of the dial gauge is still at zero.

In Fig. 4 the major load is applied to the work by the major load spring 20. This causes the point 21 to penetrate considerably deeper into the work 25 than when only the minor load is applied. The relative movement between the supporting case and the test rod resulting from this penetration, which movement includes extremely small elastic deformations of the linkage, is now transmitted to the dial indicator at an enlarged scale. The pointer indicates a value somewhat lower than the actual hardness value which will be presently shown.

In Fig. 5 the test screw 24 carrying the work has travelled downward somewhat. The major load spring can no longer act on the work; the minor load, however, is still effective. The pointer of the dial indicates the correct hardness.

Figure 4 illustrates the stage of the examining process wherein the body 21 pressed into the work piece is still under the action of the main load and therefore the depth of penetration corresponding to the actual degree of hardness is increased by the amount of the elastic deformations which take place. Figure 5, on the other hand, shows the stage of the examination process in which the main load is removed. Therefore in Figure 5 the body 21 has penetrated to a lesser depth into the work piece since elastic deformations no longer occur after the removal of the main load. The degree of hardness indicated in Figure 5 is greater than that indicated in Figure 4 since the degree of hardness increases in the same proportion in which the depth of penetration is decreased. The degree of hardness indicated in Figure 5 is actually the hardness in accordance with the Rockwell process which, as is well known, endeavors to eliminate the elastic deformations and consists in the measuring of the depth of penetration after an increase of the load from a small preliminary load to a much larger main load, whereupon the load is again diminished to the preliminary load.

In Fig. 6 the test screw 24 together with the work has moved down some more. This movement has been followed by the test rod 3 and the supporting case 2 and has caused the bell crank 9 pivotally mounted to the dial indicator holder 7 to travel away from the stop 10, with the result that the sliding wedge 11 is pushed between the dial indicator holder and the dial indicator arm. The sliding member 4 is still coupled with the supporting case 2. The test rod and the supporting case have not completely returned as yet to their initial position in which they rest on the frame. Before they reach this position the locking member 13 will be released, so that the sliding member 4 is free to move. With the sliding member 4 being disengaged from the supporting case 2, the test rod 3 will return to its seat on the frame, following which the supporting case 2 will also come to rest on frame 1. In doing so the supporting case 2 protects penetrator 21 from damage through its guiding sleeve.

I claim:

1. Rockwell testing device comprising a frame adapted to support the testing mechanism, a vertically reciprocable work supporting member beneath said frame, an apertured supporting case slidably arranged in said frame and acted upon by said work supporting member so as to move in upward direction, spring means for yieldingly opposing upward movement of said supporting case, a motion limiting means on said frame for limiting downward movement of said supporting case, a vertically displaceable test rod housed in said supporting case and projecting through opposedly arranged bores of it, a penetrator carried by the bottom of said test rod and acted upon by said work-supporting means, indicating-means fixedly connected with said test rod through the medium of a holder, means for limiting downward movement of said test rod, operating means for actuating said indicating means, means on said test rod for pivotally connecting said test rod with said operating means, a coupling means for temporarily connecting said operating means with said apertured supporting case, a tapered wedge slidably located between said indicator holder and said operating means for varying the distance between said dial indicator holder and said operating means, a spring having one end connected to the operating means, the other end of the spring being connected to said tapered wedge, a bell crank rotatably mounted on said dial indicator holder, a stop on said frame for engaging said bell crank, thereby limiting the upward movement of said bell crank, a stop on said sliding wedge adapted to be engaged by said bell crank, a minor load spring mounted on said frame and pressing on said test rod, and a major load spring secured to said frame and adapted to act upon said test rod, thereby causing said test rod to move relatively to said supporting case and to urge said penetrator into the work to be tested.

2. Rockwell testing device comprising a frame adapted to support the testing mechanism, a test screw beneath said frame for supporting the work to be tested and adapted to lift or lower said work, an apertured supporting case slidably arranged in said frame and acted upon by said screw so as to move in upward direction, a spring bearing against said supporting case and yieldingly opposing upward movement of said supporting case, a seat on said frame so as to limit the spring-caused movement of said supporting case, an axially displaceable test rod housed in said supporting case and projecting through opposedly arranged bores of it, a penetrating means on said test rod to be applied to said work, a dial indicator holder on said test rod holding a dial indicator, a shoulder on said test rod for limiting the downward displacement of said test rod by abutting against said frame, a knife edge of said test rod situated close to said dial indicator holder, a spring-actuated sliding member housed in a separate compartment of said supporting case and being able to slide parallel to said test rod, an operating arm for actuating said dial indicator and pivotally connected with said sliding member, said operating arm being pivotally supported by said knife edge, a tapered wedge slidably located between said indicator holder and said operating means for varying the distance between said dial indicator holder and said operating means, a spring having one end connected to the operating means, the other end of the spring being connected to said tapered wedge, a bell crank rotatably mounted on said dial indicator holder, a stop on said frame for engaging said bell crank thereby limiting the upward movement of said bell crank, a stop on said sliding wedge adapted to be engaged by said bell crank, a minor load spring mounted on said frame and pressing on said test rod, a major load spring secured to said frame and adapted to act upon said test rod, thereby causing said test rod to move relatively to said supporting case and to urge said penetrating means into the work to be tested, and a locking member mounted on said supporting case and adapted to press on said sliding member, a spring pressing said locking member against said sliding member, and a release mechanism for temporarily releasing the pressure of said spring on said locking member.

3. Rockwell testing device comprising a frame adapted to support the testing mechanism, a vertically movable work supporting member beneath said frame, an apertured supporting case slidably arranged in said frame and acted upon by said work supporting member so as to move in upward direction, spring means for yieldingly opposing upward movement of said supporting case, a motion limiting means on said frame for limiting downward movement of said supporting case, a vertically displaceable test rod housed in said supporting case and projecting through opposedly arranged bores of it, a penetrator carried by the bottom of said test rod and acted upon by said work-supporting means, indicating means fixedly connected with said test rod through the medium of a holder, means for limiting downward movement of said test rod, operating means for actuating said indicating means, means on said test rod for pivotally connecting said test rod with said operating means, a tapered wedge slidably located between said indicator holder and said operating means for varying the distance between said dial indicator holder and said operating means, a spring having one end connected to the operating means, the other end of the spring being connected to said tapered wedge, a bell crank rotatably mounted on said dial indicator holder, a stop on said frame for engaging said bell crank, thereby limiting the upward movement of said bell crank, a stop on said sliding wedge adapted to be engaged by said bell crank, a minor load spring mounted on said frame and pressing on said test rod, a major load spring secured to said frame and adapted to act upon said test rod thereby causing said test rod to move relatively to said supporting case and to urge said penetrator into the work to be tested, a spring-actuated sliding member housed in a separate compartment of said supporting case and being able to slide parallel to said test rod, said sliding member being pivotally connected with said operating means, said case being provided with a bore at right angles to and communicating with said compartment, a locking member slidably arranged in said bore, a leaf-spring having one end fixed to said supporting case, a wedge-shaped block slidably mounted on said supporting case and having a slanting surface, the free end of said leaf-spring bearing against said slanting surface, and a stop on said frame for causing said wedge-shaped block to move relatively to said supporting case, whereby upon movement of said wedge-shaped block the free end of said leaf-spring slides off said slanting surface and forces the locking member into frictional contact with said sliding member.

4. Rockwell testing device comprising a frame adapted to support the testing mechanism, a test screw beneath said frame for supporting the work to be tested and adapted to lift or lower said work, an apertured supporting case slidably arranged in said frame and acted upon by said test screw so as to move in upward direction, a spring bearing against said supporting case and yieldingly opposing the upward movement of said supporting case, a seat on said frame so as to limit the spring-caused movement of said supporting case, an axially displaceable test rod housed in said supporting case and projecting through opposedly arranged bores of it, a penetrating means on said test rod to be applied to said work, a dial indicator holder on said test rod holding a dial indicator, a shoulder on said test rod for limiting the downward displacement of said test rod by abutting against said frame, a knife edge on said test rod situated close to said dial indicator holder, a spring-actuated sliding member housed in a separate compartment of said supporting case and being able to slide parallel to said test rod, an operating arm for actuating said dial indicator and pivotally connected with said sliding member, said operating arm being pivotally supported by said knife edge, a tapered wedge slidably arranged between said indicator holder and said operating arm for varying the distance between said dial indicator holder and said operating arm, a spring actuating said wedge, a bell crank rotatably mounted on said dial indicator holder, a stop on said frame for engaging said bell crank and thereby limiting its upward movement, a stop on said sliding wedge arranged so as to be abutted against by said bell crank, a minor load spring mounted on said frame and pressing on said shoulder of said test rod, a major load spring secured to said frame and adapted to act upon said test rod thereby causing said test rod to move relatively to said supporting case and to urge said penetrating means into the work to be tested, and a locking member mounted on said supporting case and adapted to press on said intermediate member, a spring pressing said locking member against said intermediate member, and a release mechanism for temporarily releasing the pressure of said spring on said locking member.

5. Rockwell testing device comprising a frame adapted to support the testing mechanism, a test screw beneath said frame for supporting the work to be tested and adapted to lift or lower said work, an apertured supporting case slidably arranged in said frame and acted upon by said test screw so as to move in upward direction, a spring bearing against said supporting case and yieldingly opposing the upward movement of said supporting case, a seat on said frame so as to limit the spring-caused movement of said supporting case, an axially displaceable test rod housed in said supporting case and projecting through opposedly arranged bores of it, a penetrating means on said test rod to be applied to said work, a dial indicator holder on said test rod holding a dial indicator, a shoulder on said test rod for limiting the downward displacement of said test rod by abutting against said frame, a knife edge on said test rod situated close to said dial indicator holder, a spring-actuated sliding member housed in a separate compartment of said supporting case and being able to slide parallel to said test rod, an operating arm for actuating said dial indicator and pivotally connected with said sliding member, said operating arm being pivotally supported by said knife edge, a tapered wedge slidably located between said indicator holder and said operating means for varying the distance between said dial indicator holder and said operating means, a spring having one end connected to the operating means, the other end of the spring being connected to said tapered wedge, a bell crank rotatably mounted on said dial indicator holder, a stop on said frame for engaging said bell crank, thereby limiting the upward movement of said bell crank, a stop on said sliding wedge adapted to be engaged by said bell crank, a minor load spring mounted on said frame and pressing on said shoulder of said test rod, a major load spring secured to said frame and adapted to act upon said test rod thereby causing said test rod to move relatively to said supporting case and to urge said penetrating means into the work to be tested, a locking member mounted on said supporting case and adapted to press on said sliding member, a spring urging said locking member against said sliding member, and a release mechanism adapted to release temporarily the pressure of said spring on said locking member.

6. Rockwell testing device comprising a frame adapted to support the testing mechanism, a test screw beneath said frame for supporting the work to be tested and adapted to lift or lower said work, an apertured supporting case slidably arranged in said frame and acted upon by said test screw so as to move in upward direction, a spring bearing against said supporting case and yieldingly opposing the upward movement of said supporting case, a seat on said frame so as to limit the spring-caused movement of said supporting case, an axially displaceable test rod housed in said supporting case and projecting through opposedly arranged bores of it, a penetrating means on said test rod to be applied to said work, a dial indicator holder on said test rod holding a dial indicator, a shoulder on said test rod for limiting the downward displacement of said test rod by abutting against said frame, a knife edge on said test rod situated close to said dial indicator holder, a spring-actuated sliding member housed in a separate compartment of said supporting case and being able to slide parallel to said test rod, an operating arm for actuating said dial indicator and pivotally connected with said sliding member, said operating arm being pivotally supported by said knife edge, a tapered wedge slidably located between said indicator holder and said operating means for varying the distance between said dial indicator holder and said operating means, a spring having one end connected to the operating means, the other end of the spring being connected to said tapered wedge, a bell crank rotatably mounted on said dial indicator holder, a stop on said frame for engaging said bell crank, thereby limiting the upward movement of said bell crank, a stop on said sliding wedge adapted to be engaged by said bell crank, a minor load spring mounted on said frame and pressing on said shoulder of said test rod, a major load spring secured to said frame and adapted to act upon said test rod thereby causing said test rod to move relatively to said supporting case and to urge said penetrating means into the work to be tested, said case being provided with a bore at right angles to and communicating with said compartment, a locking member slidably arranged in said bore, a leaf-spring having one end fixed to said supporting case, a wedge-shaped block slidably mounted on said supporting case and having a slanting surface, the free end of said leaf-spring bearing against said slanting surface, and a stop on said frame for causing said wedge-shaped block to move relatively to said supporting case, whereby upon movement of said wedge-shaped block the free end of said leaf-spring slides off said slanting surface and forces the locking member into frictional contact with said sliding member.

7. Rockwell testing device comprising a frame adapted to support the testing mechanism, a test screw beneath said frame for supporting the work to be tested and adapted to lift or lower said work, an apertured supporting case slidably arranged in said frame and acted upon by said test screw so as to move in upward direction, a spring bearing against said supporting case and yieldingly opposing the upward movement of said supporting case, a seat on said frame so as to limit the spring-caused movement of said supporting case, an axially displaceable test rod housed in said supporting case and projecting through opposedly arranged bores of it, a penetrating means on said test rod to be applied to said work, a dial indicator holder on said test rod holding a dial indicator, a shoulder on said test rod for limiting the downward displacement of said test rod by abutting against said frame, a knife edge on said test rod situated close to said dial indicator holder, a spring-actuated sliding member housed in a separate compartment of said supporting case and being able to slide parallel to said test rod, an operating arm for actuating said dial indicator and pivotally connected with said sliding member, said operating arm being pivotally supported by said knife edge, a tapered wedge slidably arranged between said dial indicator holder and said operating arm for varying the distance between said dial indicator holder and said operating arm, a spring actuating said wedge, a bell crank rotatably mounted on said dial indicator holder, a stop on said frame for engaging said bell crank and thereby limiting its upward movement, a stop on said sliding wedge adapted to be abutted against by said bell crank, a minor load spring mounted on said frame and pressing on said shoulder of said test rod, a major load spring secured to said frame and adapted to act upon said test rod thereby causing said test rod to move relatively to said supporting case and to urge said penetrating means into the work to be tested, said case being provided with a bore at right angles to and communicating with said compartment, a locking member slidably arranged in said bore, a leaf-spring having one end fixed to said supporting case, a wedge-shaped block slidably mounted on said supporting case and having a slanting surface, the free end of said leaf-spring bearing against said slanting surface, and a stop on said frame for causing said wedge-shaped block to move relatively to said supporting case, whereby upon movement of said wedge-shaped block the free end of said leaf-spring slides off said slanting surface and forces the locking member into frictional contact with said sliding member.

References Cited in the file of this patent

UNITED STATES PATENTS

| Number | Name | Date |
|---|---|---|
| 1,596,003 | Davis | Aug. 17, 1926 |
| 1,973,333 | Craemer | Sept. 11, 1934 |
| 2,099,216 | Nass et al. | Nov. 16, 1937 |
| 2,473,179 | Sklar | June 14, 1949 |

FOREIGN PATENTS

| Number | Country | Date |
|---|---|---|
| 613,787 | Germany | May 24, 1935 |